May 17, 1966　　　E. L. KLAVITTER　　　3,252,075
VOLTAGE REGULATOR

Filed Aug. 21, 1962　　　　　　　　　　　　3 Sheets-Sheet 1

INVENTOR.
Ernest L. Klavitter
BY
Harness, Dickey & Pierce
ATTORNEYS

May 17, 1966   E. L. KLAVITTER   3,252,075
VOLTAGE REGULATOR
Filed Aug. 21, 1962   3 Sheets-Sheet 2
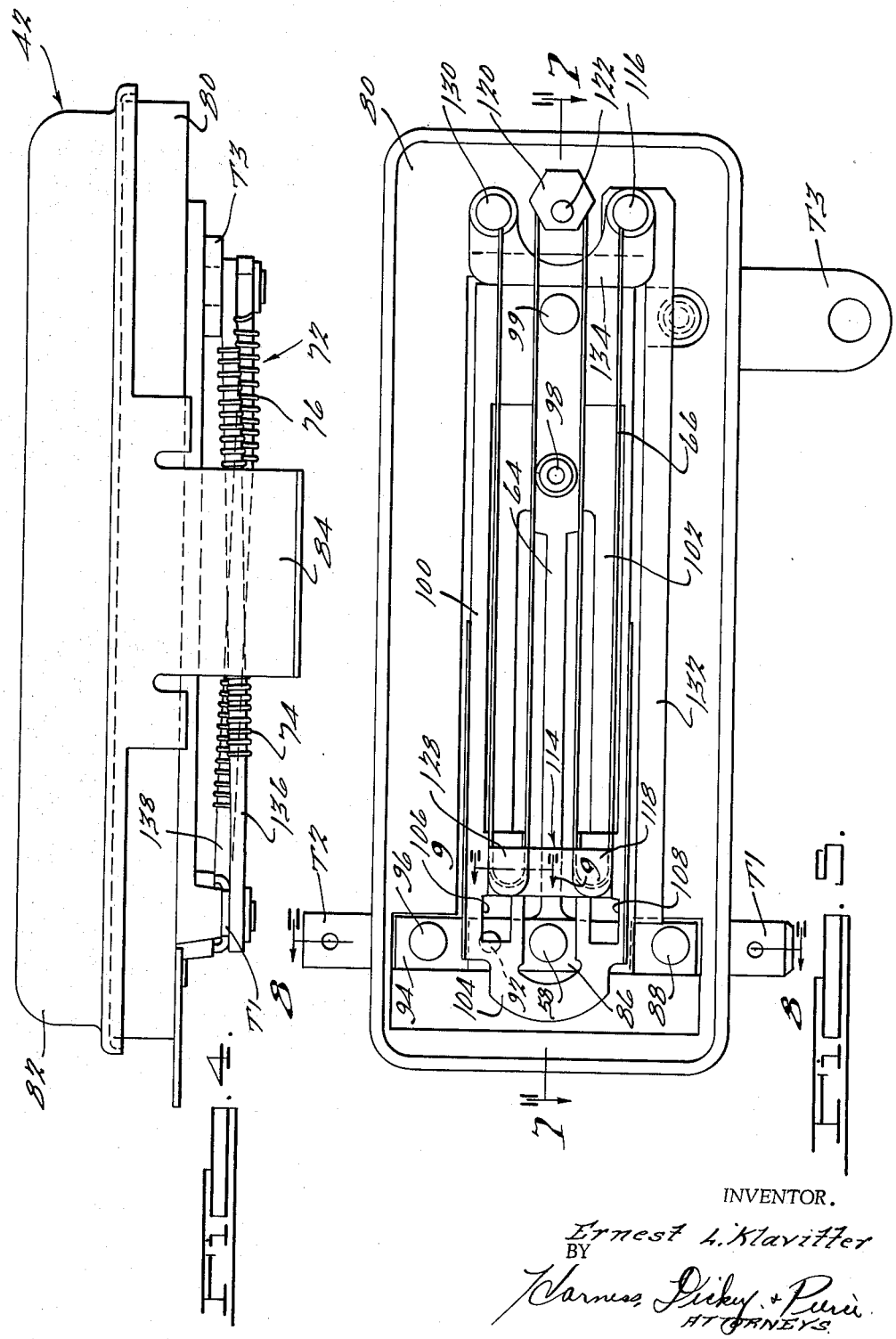
INVENTOR.
Ernest L. Klavitter
BY
Harness, Dickey & Pierce
ATTORNEYS.

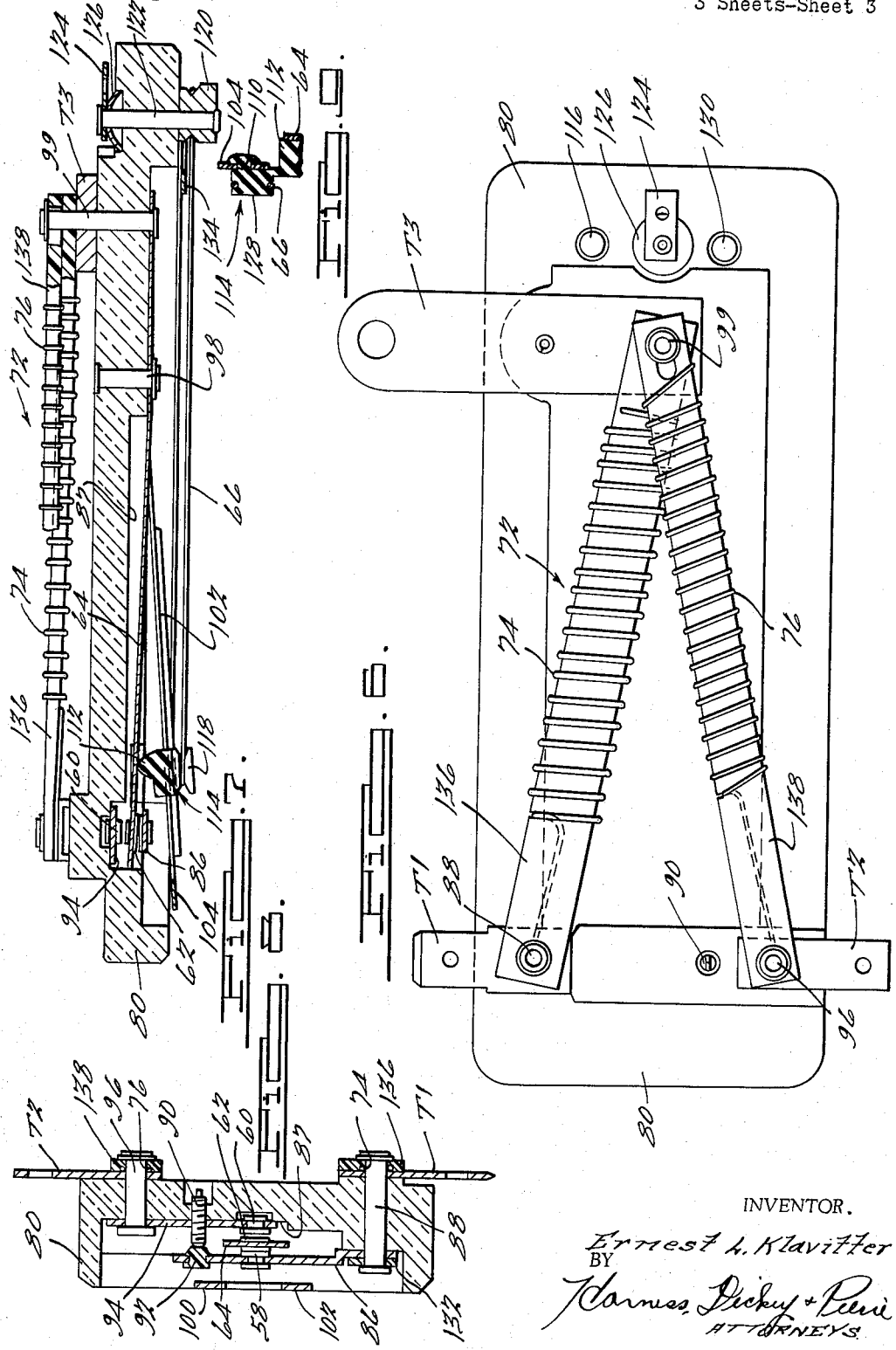

3,252,075
VOLTAGE REGULATOR
Ernest L. Klavitter, Ann Arbor, Mich., assignor to King-Seeley Thermos Co., Ann Arbor, Mich., a corporation of Michigan
Filed Aug. 21, 1962, Ser. No. 218,412
15 Claims. (Cl. 322—28)

This invention relates to voltage regulators and more particularly to voltage regulators having contacts controlled by means of an electrothermal actuator.

Important objects of this invention are to improve regulators for controlling the voltage from an unregulated source; to improve such regulators by controlling the voltage from such a source by means of an electrothermal actuator which is responsive to changes in electrical energization from the source; and to obtain such electrothermal actuator control by means including a pair of contacts which control the energization of said electrothermal actuator from the source.

Certain features of the invention include improving voltage regulators of the type which comprise a first movable contact operatively associated with a pair of spaced contacts which are electrically connected to circuit means for varying the current passing through the field coil of a voltage generating device such as an alternator so as to control the output thereof by controlling the first movable contact by means of an electrothermal actuator which is responsive to changes in electrical energization from the alternator output.

Further features of the invention include controlling the output of a voltage generator, for example, an alternator, by means of a voltage regulator which includes a first movable contact which is biased in a first direction with respect to a second contact, circuit means including said contacts for connecting the alternator output across the field coil thereof, electrothermal actuator means associated with said first movable contact for moving said first contact relative to said second contact in response to a predetermined electrical energization thereof from the alternator output, and means including said first and second contacts to control the energization of said electrothermal actuator means from the alternator output at said predetermined electrical energization thereof to regulate the voltage across the field coil of said alternator and thereby control the output of said alternator.

The manner of accomplisihng the foregoing objects, and other objects and features of the invention, will become apparent from the following detailed description of different embodiments of the invention when read with reference to the accompanying drawings in which:

FIGURE 4 is a view in side elevation of a working embodiment of the voltage regulating device schematically illustrated in FIGURE 2;

FIGURE 5 is a top plan view of the device illustrated in FIGURE 4 with its cover removed;

FIGURE 6 is a bottom plan view of the device illustrated in FIGURE 4;

FIGURE 7 is a view in vertical section taken along the line 7—7 of FIGURE 5 looking in the direction of the arrows;

FIGURE 8 is a view in vertical section taken along the line 8—8 of FIGURE 5 looking in the direction of the arrows; and FIGURE 9 is a view in vertical section taken along the line 9—9 of FIGURE 5 looking in the direction of the arrows.

Figure 1:
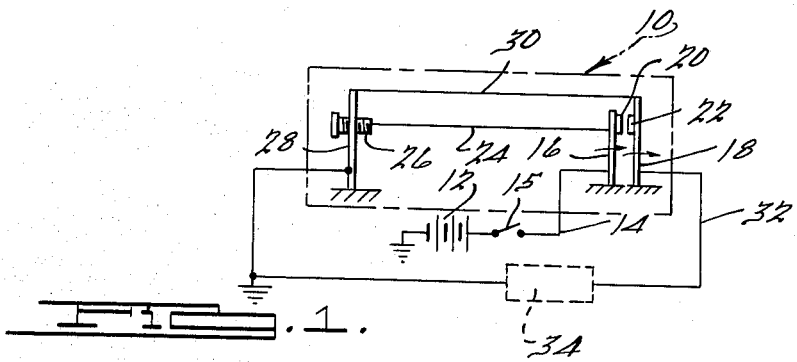
FIGURE 1 is a schematic diagram of a control system including a voltage regulator embodying certain of the principles of the present invention.

Referring now to FIGURE 1 of the drawings, a voltage regulator 10, constructed in accordance with certain of the principles of the present invention, is illustrated as being operatively connected to a variable source of power such as a battery 12 by means of a conductor 14 including a switch 15.

More particularly, the voltage regulator 10 includes a first, electrically conductive cantilevered spring arm 16 which is biased in a first direction toward a second electrically conductive cantilevered spring arm 18 which is biased therefrom in the same direction. The freely movable end of the spring arm 16 has a first contact 20 electrically and mechanically connected thereto which is operatively associated with a second contact 22 which is electrically and mechanically connected to the freely movable end of the spring arm 18.

The freely movable end of the spring arm 16 is restrained by means of an elongated wire 24 having one end thereof connected to the freely movable end of the spring arm 16 and the opposite end thereof connected to an adjusting screw 26 which threadably engages a rigid arm 28 of electrically conductive material which is connected to suitable fixed support means. The voltage regulator 10 further includes a wire 30 of appropriate electrothermal characteristics including a finite resistance and a substantial coefficient of thermal expansion which self-heats, and expands, in response to electrical energization thereof.

Wire 30 is connected between the rigid arm 28 and the freely movable end of the second cantilevered spring arm 18. Wire 30, when contracted, pulls the freely movable end of spring arm 18 in the direction of rigid arm 28 so as to bring contact 22 into engagement with contact 20. This completes a circuit from one terminal of source 12 (the other terminal of which is grounded), switch 15, conductor 14, the spring arm 16, the contacts 20, 22, the wire 30, and the rigid arm 28, to ground. The variable voltage of the battery 12 is thereby impressed across the wire 30 causing the wire 30 to self-heat and elongate to allow the spring arm 18 to move the contact 22 out of engagement with the contact 20. Once the contacts 20, 22 are opened, the wire 30 will cool and contract so as to force the spring arm 18 in a direction to reclose the contacts 20, 22. This causes the wire 30 to again heat and elongate to produce the above discussed separation of the contacts 20, 22 and this self-interrupting operation, in which the wire both controls and is controlled by the contacts 20, 22, continues cyclically, with the wire 30 functioning to maintain the contacts 20, 22 in an incipient opening and closing state with the temperature of the wire 30 undulating about that temperature at which the contacts 20, 22 just close. Since the average rate of energy consumption of the wire 30 may, of course, be expressed in terms of watts ($E^2/R$) and since with relatively fixed radiating conditions the average resistance of wire 30 may be assumed to be substantially constant, it follows that the average voltage appearing across the wire 30 (as averaged over a series of pulsations of the contacts 20, 22) is substantially constant. Thus, the regulator 10 acts to maintain a substantially constant average voltage input to a load device connected in parallel therewith, irrespective of variations in voltage of a source such as the battery 12.

The output or control or load circuit of the described circuit includes the battery 12, switch 15, conductor 14, spring arm 16, contacts 20 and 22, conductor 32, and an output device 34. If desired, the output device 34 may be any load requiring such a constant voltage or a transducer and responder arrangement such as the sensor and control responder shown in Boddy Patent No. 2,910,569, issued October 27, 1959. Alternatively, the output device 34 may be a generator in an automobile electrical system (with or without a resistance network) which has the output thereof controlled in a manner which is herein more detailedly set forth in the embodiment of the invention set forth in FIGURE 3.

In the illustrated arrangement, the wire 24 is not energized from the battery 12 since the adjusting screw 26 is constructed from a suitable electrical insulating material. Accordingly, the wire 24 will maintain the spring arm 16 and the contact 20 at a preselected location with respect to the contact 22 depending on the adjustment of screw 26. The wire 24 further acts as ambient temperature compensating means and thereby has a coefficient of thermal expansion which is proportioned so that the wire 24 will expand to the same degree as the wire 30 in response to variations in ambient temperature to maintain a preselected relationship between the contacts 20, 22.

Figure 2:
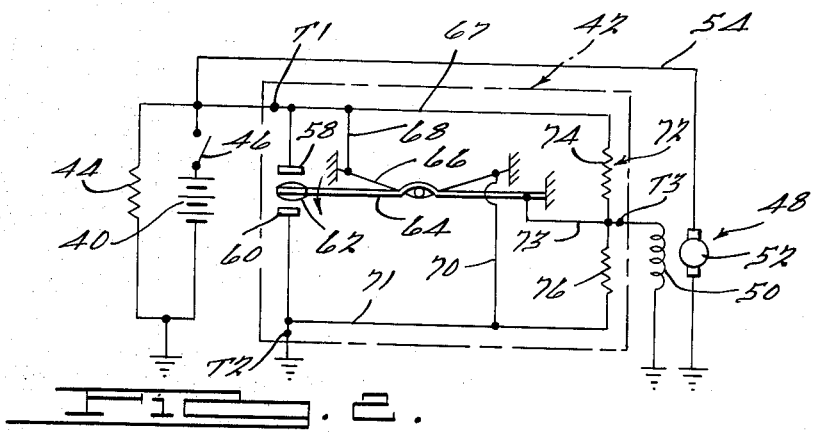
FIGURE 2 is a schematic diagram of an alternator type ignition system which includes a voltage regulator embodying certain other of the principles of the present invention.

In FIGURE 2, an alternator type electrical system is diagrammatically illustrated as including a battery 40, a load 44, a switch 46, and a conventional voltage generating device which for purposes of this discussion is representatively illustrated as an alternator 48 (the output of which is rectified to produce a direct current). The switch 46 may, for example, be the ignition switch of an automobile or the like and the alternator 48 is of the type which includes a field coil 50 and an armature 52 which has the output terminal thereof electrically connected to the battery 40 by means of a conductor 54 and the switch 46. Conventional cut-out switch means (not shown) may be included in the circuit in a conventional manner to prevent discharge of the battery 40 through the armature 52 of the alternator 48 when the ignition switch 46 is closed and an engine or the like driving the alternator 48 is not running. The battery 40 and alternator 48 are interconnected in a conventional fashion so that either source of potential may energize the load 44 which may be the lights, instruments and other electrical circuits of an automobile or the like. The interconnection of battery 40 and alternator 48 is such that the battery 40 can be charged from the alternator 48.

The voltage ouput of the alternator 48 is controlled by means of a voltage regulator 42 which has terminals $T_1$, $T_2$ and $T_3$. The regulator further includes a pair of spaced electrical contacts 58, 60 and an electrothermal actuator which is representatively illustrated as a wire 66 which has appropriate electrothermal characteristics including a finite resistance and a high coefficient of thermal expansion. The wire 66 is representatively illustrated as an elongated wire which has its opposite ends anchored at suitable fixed support means and an intermediate portion thereof mechanically coupled to a cantilevered spring arm 64 of electrically conducted material which carries a contact 62 on the freely movable end thereof between the contacts 58, 60. The spring arm 64 biases the contact 62 in a first predetermined direction against the restraining action of the wire 66 which self-heats and elongates when a voltage is impressed thereacross to allow the spring arm 64 to move the contact 60 in said first predetermined direction relative to the pair of spaced contacts 58, 60.

When the switch 46 is open there is no voltage applied across the wire 66 and it is, therefore, contracted between the anchored ends thereof to prestress the spring arm 64 sufficiently to move the contact 62 into engagement with the contact 58. Upon closure of the switch 46 a circuit is completed including the battery 40, switch 46, terminal $T_1$, conductors 67, 68, wire 66, and conductors 70, 71 to ground. If the voltage applied across the wire 66 is less than a first predetermined voltage, wire 66 will not be heated sufficiently to permit separation of the contacts 58, 62. Under this condition the field coil 50 is energized to the maximum extent via a load or output circuit including battery 40, switch 46, terminal $T_1$, closed contacts 58, 62, spring arm 64, a conductor 73, the terminal $T_3$ and the field coil 50 to ground. It will be observed that under this condition a first resistor 74 of a voltage divider 72 is rendered ineffective by the contacts 58, 62 and a second resistor 76 of the divider 72 shunts the winding 50. Accordingly, the alternator 48 will then develop its maximum output voltage (for its then driven speed).

When the voltage output of the alternator 48 ranges between the first predetermined voltage and a second predetermined voltage the contacts 58, 60, being to pulse in a cyclic fashion. For example, at idling speed, and with a load which draws approximately 10 amps across a fully charged battery of approximately 12.5 volts, the contacts 58, 62 will open when the alternator voltage output reaches approximately 13.2 volts. Once the contacts 58, 62 are opened, current will pass through a circuit defined by battery 40, switch 46, terminal $T_1$, conductor 67, the resistance 74 of the voltage divider 72, and the coil 50 of the alternator to ground. The voltage drop across the resistance 74 will reduce the current passing through the field coil 50 of the alternator 48 and thereby cause the voltage ouput thereof to drop below 13.2 volts (the second predetermined voltage). Once the voltage output is so reduced, the wire 66 will cool a predetermined amount and thereby contract between the anchored ends thereof causing the cantilevered arm 64 to move the contact 62 into reengagement with the contact 58. This will cause the resistor 74 to again be shunted and greater current will again pass through the field coil 50 to cause a corresponding increase in the voltage output of the alternator 48. The contacts 58, 62 will continue to pulse under the control of the wire 66 until the average voltage output of the alternator due, for example, to an increase in its driven speed, reaches a value above the second predetermined voltage (but less than a third predetermined voltage) at which the wire 66 elongate sufficiently to maintain contacts 58, 60 separated.

During this stage of operation the combined effect of the load 44 and speed at which the alternator 48 is driven corresponds to operating conditions which are most frequently present in a given alternator type electrical system. It is desirable that the operative contacts of the voltage regulator 42 be held between contacts 58, 60 during such operation in order to minimize contact wear. Accordingly, when the second predetermined voltage output is imposed across the wire 66 it will elongate to a predetermined degree to as to allow the spring arm 64 to deflect away from the contact 58 and locate the contact 62 between the contacts 58 and 60.

During this phase of the regulator operation, current passes through the resistor 74 of the voltage divider 72 which is proportioned to maintain the voltage output of the alternator 48 at a value between the second predetermined and a third predetermined voltage level when the load 44 and speed of operation of the alternator 48 are within the above discussed range. For example, in one working embodiment when there is a load which draws approximately 15 amps across the battery and the alternator 48 is operating at a speed produced by a vehicle speed of approximately 25 to 30 miles an hour, the output voltage of the alternator 48 is approximately 13.5 volts.

It will, of course, be appreciated that if either the load 44 is increased or the driven speed of the alternator 48 decreases, the voltage output of the alternator will drop and thereby cause the wire 66 to contract between the anchored ends thereof sufficiently to cause the contacts 58, 62 to reengage and operate as a pulsing pair of contacts under the control of the wire 66 as previously discussed in the first stage of operation of the regulator 42.

If the voltage output of alternator 48 approaches the third predetermined value which is in excess of the first and second predetermined voltages discussed above, the wire 66 will elongate further between the anchored ends thereof to allow the spring arm 64 to move the contact 62 into engagement with the second contact 60 (in one working embodiment such engagement occurs when the voltage output of the regulator is 14.0 volts). When the contacts 60, 62 are in engagement, the field coil 50 of the alternator 48 is shorted through a circuit including conductor 73, spring arm 64, and contacts 60, 62 to ground to cut off the alternator output. During this phase of operation the resistor 74 prevents shorting of the battery 40 to ground. The wire 66 will thereby contract a predetermined degree to open the contacts 60, 62 to reenergize the coil 50 and thereby increase the voltage output of the alternator. If conditions continue to cause the alternator to produce an output voltage of approximately 14 volts, the contacts 60, 62 will reengage to short out the alternator field 50. In other words, during the third stage of regulator operation, the contacts 60, 62 will pulse under the control of the wire 66 so as to maintain the average voltage output of alternator 48 at approximately 14 volts.

Thus, it will be observed that energization of the wire 66 is controlled by the contacts 58, 60, 62 in that a change of state of contacts 58, 60, 62 produced by wire 66 will change the output of the alternator 48 which in turn changes the energization of the wire 66.

In the structural views, illustrating a preferred construction of the regulator 42 illustrated in FIGURE 2, the regulator 52 is mounted on a base 80 having one face thereof enclosed by a cover 82 which includes an outwardly directed arm portion 84 which is adapted to be secured to suitable support means for supporting the regulator 42 with respect to other components of a typical alternator type ignition system or the like.

In the preferred construction, the first contact 58 is secured to a strip 86 of electrically conductive material which is in spaced parallelism with and generally transverse to a recessed surface 87 in the covered face of the base 80 adjacent one end thereof. One end of the strip 86 is mechanically secured to the base by means of a rivet 88 which also electrically connects the terminal $T_1$ to the strip 86 and the contact 58. The opposite end of the conductive strip 86 is adjustably movable with respect to the base 80 by means of a threaded screw 90 in threaded engagement with the base 80 which has one end thereof directed through the base 80 into engagement with a resilient bumper element 92 of suitable electrical insulating material which is secured to the opposite end of the strip 86. Adjustment of the screw 90 will determine the second predetermined voltage level of regulator operation as discussed above. The second contact 60 of the regulator illustrated in FIGURE 2 is carried on a strip of conductive material 94 which is in spaced parallelism with the strip 86 and supported on the recessed surface 87 of the base 80 by means of a rivet 96 which is directed through the base 80 to electrically connect the strip 94 with the terminal $T_2$ of the regulator 42.

In the preferred construction, the movable contact 62 is located intermediate the contacts 58, 60 on the freely movable end of the elongated cantilevered spring arm 64 which has the opposite end thereof anchored to the base 80 by means of a rivet 98. The arm 64 is also electrically connected to the terminal $T_3$ of the regulator by means of a rivet 99. The cantilevered spring arm 64 is operatively connected to the wire 66 of the regulator 42 by means of a pair of laterally spaced elongated spring arms 100, 102, which are connected at one end thereof to the anchored end of the spring arm 64. Each of the elongated spring arms 100, 102 extend therefrom longitudinally of the spring arm 64 on either side thereof to a point adjacent the freely movable end of the spring arm 64 where they are interconnected by means of a transverse arm 104 having a pair of laterally spaced apertures 106, 108 therein which have a wide portion and a narrow portion. The portion of the transverse arm 104 defining the narrow portion of the apertures 106, 108 inserts in grooves 110 defined in the base portion 112 of a connector element 114 for securing the connector element 114 to the transverse arm 104. The elongated spring arms 100, 102 and spring arm 64 are all spring-biased toward the connector element 114 which acts to space the spring arm 64 a predetermined distance from the spring arms 100, 102.

The connector element 114 is also operatively connected to the wire 66 of the regulator 42 so that variations in the energization of the wire 66 will cause the connector element 114 to move the contact 62 relative to the first and second contacts 58, 60 in accordance with the regulator operation discussed above.

More specifically, in the preferred embodiment the wire 66 is representatively illustrated as comprising a single long wire which is wound to define a plurality of reaches, representatively four in number, which extend substantially parallel to the recessed surface 87 of the base 80. One end of the wire 66 connects to one end of an anchor post 116 having the opposite end thereof secured to the base 80. The wire extends therefrom longitudinally of the base 80 to the connector element 114 where it is wound around an outwardly directed ear portion 118 thereof from whence it returns to the opposite end of base 80 where it is wound around the outer circumferential surface of a nut 120 which is rotatably and eccentrically mounted on one end of a post 122 which has its opposite end directed through the base 80 where it is secured to a terminal 124 by means of a snap spring 126.

The wire 66 is directed from the adjusting nut 120 longitudinally of the base 80 to the connector element 114 where it is wound around a second outwardly directed ear portion 128 thereof which is spaced laterally of the first ear portion 118. The wire then returns to the opposite end of the base 80 where it connects to one end of an anchor post 130 which has the opposite end thereof secured to the base 80.

In the preferred embodiment, the wire 66 is electrically connected to the terminal $T_1$ of the regulator 42 by means of an elongated strip of conductive material 132 (FIG. 5) which has one end connected to the terminal $T_1$ and the opposite end thereof located at the opposite end of base 80 where a transverse leg portion 134 thereof electrically connects to the laterally spaced anchor posts 116, 130. Hence, when the regulator 42 is connected in a system such as the alternator type electrical system illustrated in FIGURE 2, which has its ignition switch closed, current will pass through a circuit including the source, the ignition switch, terminal $T_1$, conductor 132, wire 66, adjusting cam 120, and thence to grounding terminal 124. The wire 66, will, accordingly, elongate between the anchor points defined by the connector element 114 and the anchor posts 116, 130 to allow the cantilevered spring arm 64 to move contact 62 with respect to the first and second fixed contacts 58, 60 to produce the previously discussed regulation.

In the preferred embodiment, the voltage divider 72 of the circuit illustrated in FIGURE 2, is mounted on the open face of the base 80 in order that the resistor elements 74, 76 thereof will be cooled by ambient air when the voltage divider 72 is in circuit between the terminals $T_1$ and $T_3$ of the regulator. More specifically, in the preferred construction, the first resistor 74 of the voltage divider 72 has one end thereof electrically connected to the terminal $T_1$ and the opposite end thereof electrically connected to the terminal $T_3$ at the rivet 99. Intermediate the terminals $T_1$ and $T_3$ the resistor 74 is wound on an elongated strip of insulating material 136 which is directed substantially longitudinally of the base 80 with the opposite ends thereof connected to the rivet 88 and the rivet 99, respectively.

The resistor 76 of the voltage divider 72 which connects across the field coil of a device such as the alternator 48 illustrated in FIGURE 2, in the preferred construction, has the opposite ends thereof electrically connected between the terminal $T_2$ and terminal $T_3$ of the regulator and is wound intermediately thereof on an elongated strip of insulating material 138 which has the opposite ends thereof connected to the rivet 99 and the rivet 96, respectively. Such an arrangement enables ambient air to circulate completely around each of the resistor elements of the voltage divider 72 so that heat generated thereby will be dissipated by the surrounding air to prevent an undesirable temperature increase in the regulator 42.

The operation of the preferred construction of the regulator 42 is the same as the operation of the aforementioned operation of the device illustrated in FIGURE 2. For example, when the alternator output is at or below the first predetermined voltage level of the first stage of operation, current will pass from the source, to terminal $T_1$, rivet 88, conductor strip 86, closed contacts 58, 62 and thence through the cantilevered spring arm 64, rivet 99, terminal $T_3$ and the field coil of the alternator to ground. In cases in which the voltage output of the alternator is above the second predetermined voltage but less than the third predetermined voltage, the wire 66 will elongate sufficiently to cause the spring arms 100, 102 to move the connector element 114 sufficiently to produce a movement of the cantilevered spring arm 64 which will locate the movable contact 62 between the contacts 58, 60. Likewise, when the voltage output of the alternator reaches or exceeds the third predetermined voltage level, the wire 66 will elongate still further to cause the movable contact 62 to pulsingly engage the contact 60 and thereby short out the alternator field to prevent the alternator from overcharging the battery. If desired, conventional compensating means may also be included in the devices illustrated in FIGURES 2 and 3 to maintain a preselected relationship between the contacts thereof notwithstanding ambient temperature changes.

In accordance with certain other of the concepts of the present invention, an electrothermal actuator such as the wire 66 and spring arm 64 of the embodiment of FIGURE 2 can be included in a voltage regulator which will regulate the voltage output of an alternator such as the alternator 48 illustrated in the arrangement of FIGURE 2 when it reaches a predetermined maximum value, by controlling a pair of contacts in accordance with the principles of operation of the regulator illustrated in FIGURE 1.

Figure 3:
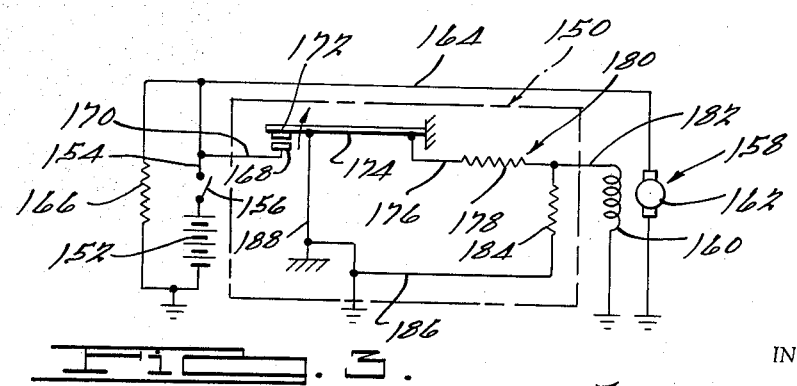
FIGURE 3 is a schematic diagram of an alternator type ignition system which includes a modified voltage regulator embodying certain other of the principles of the present invention.

More particularly, in FIGURE 3 a voltage regulator 150 is included in an alternator type electrical system of the type illustrated in FIGURE 2 including a battery 152 which is electrically connected to the regulator 150 by means of a conductor 154 having a switch 156 included therein. The electrical system further includes an alternator 158 which has a field coil 160 electrically connected to the regulator 150 and an armature 162 having the outlet terminal thereof connected to the battery 152 in a conventional fashion as discussed in the system of FIGURE 2. As in the case of the previously discussed alternator type electrical system, a load 166 is electrically connected across the battery 152 and the alternator 158.

The voltage regulator 150 more particularly comprises a first fixed contact 168 which is electrically connected by means of a conductor 170 to the conductor 154 from the battery 152 and a movable contact 172 which is adapted to be operatively engaged with the fixed contact 168. The movable contact 172 is electrically and mechanically connected to the freely movable end of a cantilevered spring arm 174 which is electrically connected by means of a conductor 176 to a first resistor 178 of a voltage divider 180 which is electrically connected to the field coil 160 of the alternator 158 by means of a conductor 182. The voltage divider 180 further comprises a second resistor 184 which is electrically connected across the field coil 160 by means of a conductor 186 to ground.

The voltage regulator 150 further comprises a wire 188 having one end thereof connected to the spring arm 174 and the opposite end thereof connected to suitable fixed support means 190. The wire 188 has one end thereof electrically connected through the contacts 168, 172 to the battery and the opposite end thereof connected to ground.

The contacts 168, 172 are constructed and arranged so that when the wire 188 is contracted between the spring arm 174 and the fixed support means 190, the spring arm 174 will be pretensioned to a predetermined degree depending upon the point at which it is desired to control the voltage output of alternator 158. It will be appreciated that the contact 168 can be adjustably fixed with respect to the spring arm 174 to provide a greater or lesser amount of such pretension.

When the contacts 168, 172 are closed, current will pass through a circuit including battery 152, switch 156, conductor 170, spring arm 174, conductor 176, resistor 178, conductor 182, and thence through the field coil 160 of alternator 158 to ground. This, of course, energizes the alternator 158. The voltage output of the alternator 158 is applied across the wire 188 causing current to pass through a circuit defined by the conductor 170, the closed contacts 168, 172, a portion of the spring arm 174, the wire 188 and thence to ground. This will cause the wire 188 to self-heat and elongate to a greater or lesser degree depending upon the output voltage of the alternator 158. In the illustrated embodiment the wire 188 is proportioned so that the contacts 168, 172 will remain closed until the alternator output reaches a predetermined maximum value which allows the wire to elongate sufficiently to open the contacts 168, 172. This deenergizes the field coil 160 of the alternator 158 and terminates the output thereof. The wire 188 will accordingly cool and contract so as to force the spring arm 174 to move in a direction to reclose the contacts 168, 172. This causes the spring arm 188 to reheat and elongate to produce the above discussed separation of the contacts 168, 172.

More particularly, the wire 188 functions to maintain the fixed and movable contacts 168, 172 in an incipient open and closing state (when the alternator output is at the predetermined maximum value) with the temperature of the wire 188 undulating about that temperature at which the contacts 168, 172 just close. Since the average rate of energy consumption of the wire 188 may, of course, be expressed in terms of watts ($E^2/R$) and since with relatively fixed radiating conditions, the average resistance of the wire 188 may be assumed to be substantially constant, it follows that the average output voltage from the alternator which appears across the wire 188 (as averaged over a series of pulsations of the contacts 168, 172) is maintained substantially constant under the control of the wire 188.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A voltage regulator associable with an unregulated source of power for regulating the voltage output thereof comprising a pair of electrical contacts having open and closed states, resilient means biasing one of said contacts in a first direction relative to the other of said contacts and tending to force said contacts towards one of said states, a wire having a high coefficient of thermal expansion adapted to be elongated and contracted in response to changes in electrical energization thereof from the source, means mechanically coupling said wire to said one of said contacts for exerting a force tending to move said one of said contacts in a direction opposite to said first direction against the bias of said resilient means and which varies with said changes of electrical energization of said wire, and means including said contacts for controlling the energization of said wire from the source for changing the electrical energization of said wire with each change of state of said electrical contacts and for producing a resultant change of state of said contacts in the opposite sense on a repetitive cyclic basis for maintaining a substantially constant voltage output from the source.

2. A voltage regulator associable with an unregulated source of power for regulating the voltage applied to a load device comprising a pair of electrical contacts having open and closed states, resilient means biasing one of said contacts in a first direction relative to the other of said contacts and tending to force said contacts towards one of said states, a wire having a high coefficient of thermal expansion adapted to be elongated and contracted in response to changes in electrical energization thereof from the source, means mechanically coupling said wire to said one of said contacts for exerting a force tending to move said one of said contacts in a direction against the bias of said resilient means and which varies with said changes of electrical energization of said wire opposite to said first direction, and means including said contacts for controlling the energization of said wire from the source for changing the electrical energization of said wire with each change of state of said electrical contacts and for producing a resultant change of state of said contacts in the opposite sense on a repetitive cyclic basis for maintaining a substantially constant voltage output from the source, said electrical contacts controlling the connection of said wire to the source.

3. A voltage regulator associable with an unregulated source of power for regulating the voltage output thereof comprising a pair of electrical contacts having open and closed states, resilient means biasing one of said contacts in a first direction relative to the other of said contacts and tending to force said contacts towards one of said states, a wire having a high coefficient of thermal expansion adapted to be elongated and contracted in response to changes in electrical energization thereof from the source, means mechanically coupling said wire to said one of said contacts for exerting a force tending to move said one of said contacts in a direction opposite to said first direction against the bias of said resilient means and which varies with said changes of electrical energization of said wire, and means including said contacts and resistor means connected in circuit with one of said contacts for controlling the energization of said wire from the source for changing the electrical energization of said wire with each change of state of said electrical contacts and for producing a resultant change of state of said contacts in the opposite sense on a repetitive cyclic basis for maintaining a substantially constant voltage output from the source.

4. A voltage regulator associable with an unregulated source of power for regulating the voltage output thereof comprising a pair of electrical contacts having open and closed states, resilient means biasing one of said contacts in a first direction relative to the other of said contacts and tending to force said contacts towards one of said states, a wire having a high coefficient of thermal expansion adapted to be elongated and contracted in response to changes in electrical energization thereof from the source, means mechanically coupling said wire to one of said contacts for exerting a force tending to move said one of said contacts in a direction opposite to said first direction against the bias of said resilient means and which varies with said changes of electrical energization of said wire, and means including said contacts for controlling the energization of said wire from the source for changing the electrical energization of said wire with each change of state of said electrical contacts and for producing a resultant change of state of said contacts in the opposite sense on a repetitive cyclic basis for maintaining a substantially constant voltage output from the source, each change of state of said electrical contacts producing a change in the voltage output of the source of power and each change of the voltage output of the source of power producing a change of the energization of said wire for producing a resultant change in the state of said contacts.

5. A voltage regulator associable with an unregulated source of power for regulating the voltage applied to a load device comprising a pair of electrical contacts having open and closed states, a cantilevered spring arm of conductive material having a freely movable end electrically connected to one of said contacts for biasing it in an opening direction relative to the other of said contacts and tending to force said contacts towards said open state, a wire having a high coefficient of thermal expansion adapted to be elongated and contracted in response to changes in electrical energization thereof from the source, means mechanically coupling said wire to one of said contacts for exerting a force tending to move said one of said contacts in a closing direction against the bias of said resilient means and which varies with said changes of electrical energization of said wire, and means including said contacts for controlling the energization of said wire from the source for changing the electrical energization of said wire with each change of state of said electrical contacts and for producing a resultant change of state of said contacts in the opposite sense on a repetitive cyclic basis for maintaining a substantially constant voltage output from the source, each closure of said electrical contacts by said wire increasing the electical energization of said wire to permit said resilient means to force said contacts open and each resultant opening of said contacts producing a reduction in the electrical energization of said wire causing one of said contacts to be moved in a direction towards the other contact to close said contacts.

6. A voltage regulator for controlling a voltage producing device of the type having a field coil and an armature comprising first and second spaced electrical contacts, a third electrical contact operatively associated with said first and second spaced contacts, resilient means biasing said third contact in a first direction relative to said first and second spaced contacts, a wire having a high coefficient of thermal expansion which is adapted to be elongated and contracted in response to changes in the electrical energization thereof from the voltage producing device, means mechanically coupling said wire to said third contract for moving said third contact in a direction opposite to said first direction, and means including said first, second and third contacts for controlling the energization of said wire from the voltage producing device.

7. A voltage regulator for controlling a voltage producing device of the type having a field coil and an armature comprising first and second spaced electrical contacts, a third electrical contact operatively associated with said first and second spaced contacts, resilient means biasing said third contact in a first direction relative to said first and second spaced contacts, a wire having a high coefficient of thermal expansion which is adapted to be elongated and contracted in response to changes in the electrical energization thereof from the voltage producing device, means mechanically coupling said wire to said third contact for moving said third contact in a direction opposite to said first direction, and means including resistor means in circuit with said first and second spaced contacts for controlling the energization of said wire from the voltage producing device.

8. A voltage regulator for controlling a voltage producing device of the type having a field coil and an armature comprising a base of electrical insulating material, first and second spaced electrical contacts, a third electrical contact operatively associated with said first and second electrical contacts, resilient means biasing said third contact in a first direction relative to said first and second spaced electrical contacts, anchor means spaced on said base, a wire having a high coefficient of thermal expansion adapted to be elongated and contracted in response to changes in electrical energization thereof from the voltage producing device, a length of said wire passing between said anchor means in substantially parallelism with one face of said base, means for mechanically coupling said wire to said third contact for moving it in a direction opposite to said first direction, and means including said first, second and third contacts for controlling the energization of said wire from the voltage producing device.

9. A voltage regulator for controlling a voltage producing device of the type having a field coil and an armature comprising a base of electrical insulating material, first and second spaced electrical contacts, a third electrical contact operatively associated with said first and second spaced electrical contacts, resilient means biasing said third contact in a first direction relative to said first and second spaced electrical contacts, anchor means spaced on said base, a wire having a high coefficient of thermal expansion adapted to be elongated and contracted in response to changes in electrical energization thereof from the voltage producing device, a length of said wire passing between said anchor means in substantial parallelism with one face of said base, means for mechanically coupling said wire to said third contact for moving it in a direction opposite to said first direction, and means including resistor means in circuit with said first and second spaced contacts for controlling the energization of said wire from the voltage producing device, said resistor means including a wire wound on an elongated strip of insulating material supported in spaced parallelism with a second face of said base.

10. A voltage regulator for regulating the voltage output of an alternator in a vehicle electrical system or the like comprising movable contact controlling means, mateable contact means, one of said contact means being mounted on said movable contact controlling means, electrothermal wire positioning means associated with said movable contact controlling means and positioning the one of said contact means into and out of engagement with the other of said contact means in accordance with an electrical condition thereof, and circuit means comprising the alternator and said mateable contacts and said electrothermal positioning means whereby said electrothermal positioning means is energized to repetitively open and close said mateable contacts to produce self-interrupting operation with the average voltage being substantially constant.

11. A device to control the voltage output of an alternator having a field winding and an armature winding in an electrical system of an automobile or the like, and comprising: contact means having an open condition and a closed condition and an incipient pulsating open and close condition, voltage responsive contact actuating means operable to change the condition of said contact means, said voltage responsive contact actuating means being connected in circuit with said armature winding of the alternator, said voltage responsive contact actuating means being arranged to maintain said contact means in the closed condition until the alternator output voltage reaches a predetermined value, circuit means connecting said armature winding to said field winding through said contact means and being effective in the closed condition of said contact means to energize said field winding, and said voltage responsive contact actuating means being arranged to maintain said contact means in the incipient pulsating opening and closing condition when voltages approximately equal to said predetermined value are applied to said voltage responsive contact actuating means to maintain the average output from the alternator substantially constant, said voltage responsive contact actuating means comprises a movable cantilevered spring arm supporting one of said contact means, wire means connected to said spring arm and being connected in circuit with said armature winding, said wire means having a normal contracted position when cool at predetermined minimum voltage output of said alternator and an extended position when heated at predetermined maximum output voltage of said alternator, said wire means normally holding said cantilevered spring arm in a stressed position and releasing said spring arm when heated to variably position said contact means.

12. A voltage regulator for regulating voltage between a variable source of power such as a battery in an automobile or the like and an output device such as a generator in an electrical system of an automobile or the like subject to variable voltage conditions due to variations in operating conditions of the automobile, and comprising electrically conductive cantilevered spring arm means biased toward a first position, a first contact electrically and mechanically connected to said spring arm means and being movable therewith, a second contact mateable with said first contact, an elongated wire having one end connected to said spring arm means and the other end fixedly supported, an electrothermal wire connected to said spring arm means and causing in one thermal condition relative movement of the spring arm means toward said second contact and engagement of the contacts and causing in another thermal condition relative movement of the spring arm means causing disengagement of the contacts, first circuit means comprising the variable source of power and said mateable contacts and said electrothermal wire whereby said electrothermal wire is connected to the battery and the generator so that variable voltages impressed across the electrothermal wire causes the wire to heat and elongate resulting in separation of the contacts at a predetermined voltage causing the wire to cool and contract resulting in closing of the contacts with the wire functioning to maintain the contacts in an incipient opening and closing state with the temperature of the wire undulating about that temperature at which the contacts just close and the average voltage being substantially constant.

13. A device to control the variable voltage output of an alternator having a field winding and an armature winding in an electrical system of a vehicle or the like and comprising contact means having an open condition and first and second closed conditions and first and second incipient open and closed conditions, voltage responsive contact actuating means operable to change the condition of said contact means, said voltage responsive contact actuating means being connected in circuit with the armature winding of the alternator, said voltage responsive contact actuating means being arranged to tend to maintain said contact means in one of the closed conditions when voltages through a range of minimal voltages, less than a first predetermined voltage are applied to said voltage responsive contact actuating means, first circuit means connecting said armature winding to said field winding through said contact means in the one closed condition and applying the varying output voltages of said alternator below the first predetermined voltage directly to said field winding, said voltage responsive contact actuating means being further arranged to tend to maintain said contact means in one of the incipient opening and closing conditions when voltages approximately equal to the first predetermined voltage are applied to said voltage responsive contact actuating means, second circuit means connecting said armature winding to said field winding in the open condition and applying a predetermined fixed voltage to said field winding, said first circuit means and said second circuit means being effective in said one of the incipient opening and closing conditions to tend to cause the average voltage output of the alternator to increase to a value above said first predetermined voltage, said voltage responsive contact actuating means being further arranged to maintain said contact means in the open condition when voltages through a medial range of voltages above said first predetermined voltage but below a second predetermined voltage are applied to said voltage responsive contact actuating means, said second circuit means being effective in said open condition to tend to maintain the voltage output of the alternator between said first predetermined value and said second predetermined value, said voltage responsive contact actuating means being further arranged to maintain said contact means in the other of said incipient opening and closing conditions when voltages approximately equal to said second predetermined voltage are applied to said voltage responsive contact actuating means, third circuit means effective in the other of said closed conditions to ground said field winding to reduce the alternator voltage output, said second circuit means and said third circuit means being effective in the other of said incipient opening and closing conditions to tend to cause the alternator voltage output to be maintained at approximately the second predetermined voltage, and said voltage responsive contact actuating means being further arranged to maintain said contact means in the other of said closed conditions when voltages greater than said second predetermined voltage are applied to said voltage responsive contact actuating means, said third circuit means being effective in the other closed condition of said contact means to ground said field winding until the alternator voltage output reaches or falls below said second predetermined voltage.

14. In an electrical system for a vehicle or the like comprising a battery, load circuits, a switch means to connect said battery to said load switch, a voltage generating device such as an alternator having an armature winding and a field winding connected in parallel to said load circuits and to said battery through said switch means; the invention comprising a voltage regulator in circuit between said field winding and said load circuits and said battery, a pair of spaced electrical contacts, a movable contact mounted for movement between an open position in spaced relationship to said contacts and first and second closed positions in engagement with one or the other of said contacts, an electrothermal actuator movably supporting said movable contact, said movable contact being normally biased into engagement with one of said contacts when said switch means is open and completing a first circuit to said field winding, said electrothermal actuator being connected in series with said switch means and subject to energization by closure of said switch means, the electrothermal characteristics of said electrothermal actuator being such as to prevent sufficient heating of said electrothermal actuator to cause disengagement of said movable contact from said one of said contacts when subjected to voltage conditions below a first predetermined voltage value, said first circuit being effective below said first predetermined voltage to cause said field winding to be subjected to maximum energization whereby the alternator is capable of developing maximum output voltage, the electrothermal characteristics of said electrothermal actuator also being such as to cause sufficient heating of said electrothermal actuator above said first predetermined voltage value to move said movable contact to an open position between said fixed contacts and tending to maintain said movable contact in an incipient opening and closing condition relative to said one of said contacts until a second predetermined voltage is attained, a second circuit having a predetermined resistance value connecting said field winding to said alternator and being effective when said movable contact is in the open position to reduce the current through the field coil and reduce the voltage output of the alternator resulting in cooling of the electrothermal actuator and reclosing of the contacts thereby tending to maintain an incipient opening and closing condition until the average voltage of said alternator reaches said second predetermined value, the electrical characteristics of said electrothermal actuator being such as to cause sufficient heating of said electrothermal actuator above a predetermined maximum voltage value to move said movable contact into engagement with the other of said contacts and to tend to maintain said movable contact in incipient opening and closing condition relative to said other of said contacts, and a third circuit connecting the field winding to ground when the movable contact engages the other of said contacts to tend to maintain the average voltage output of the alternator at or below the predetermined maximum voltage value.

15. The combination of claim 6 in which said wire is connected across the armature and in which said means including said first, second and third contacts for controlling the energization of said wire from the voltage producing device variably controls the energization of the field coil for varying the output of the armature for varying the energization of said wire.

References Cited by the Examiner
UNITED STATES PATENTS

| | | | |
|---|---|---|---|
| 2,319,241 | 5/1943 | Leuthold | 323—68 |
| 2,689,936 | 10/1954 | Kirsch et al. | 322—23 |
| 2,756,382 | 7/1956 | Wuerth | 323—68 |
| 2,944,209 | 7/1960 | Klug | 323—68 |

MILTON O. HIRSHFIELD, *Primary Examiner.*

LLOYD M. McCOLLUM, *Examiner.*